UNITED STATES PATENT OFFICE 2,245,172

PROCESS FOR PRODUCING 4-HYDROXY-1-AMINONAPHTHALENE - 8 - CARBOXYLIC ACID AND 4-HYDROXYNAPHTHOSTYRIL

Werner Zerweck and Wilhelm Kunze, Frankfort-on-the-Main-Fechenheim, Germany, assignors to General Aniline & Film Corporation, a corporation of Delaware No Drawing. Application April 1, 1938, Serial No. 199,440. In Germany April 12, 1937

2 Claims. (Cl. 260—313)

Our invention relates to a process for producing 4-hydroxy-1-aminonaphthalene-8-carboxylic acid and 4-hydroxy-naphthostyril.

In accordance with our present invention 4-hydroxy-1-aminonaphthalene-8-carboxylic acid and 4-hydroxynaphthostyril can be prepared according to a new process of manufacture by starting from 5-hydroxynaphthalene-1-carboxylic acid. The process of the invention consists in combining 5-hydroxynaphthalene-1-carboxylic acid in a strongly alkaline medium with any diazo compound whereby, in contradistinction to the statements of the chemical literature (cf. Annalen vol. 477 (1930), pages 164 and 165), combination occurs exclusively in the 8-position of the naphthalene nucleus, and by reducing the monoazo compound thus obtained in an alkaline medium with formation of the 4-hydroxy-1-aminonaphthalene-8-carboxylic acid which may be isolated as such or converted into the 4-hydroxynaphthostyril by treatment with an acid.

In order to further illustrate our invention the following example is given, the parts being by weight and all temperatures in degrees centigrade, but we wish it, however, to be understood that our invention is not limited to the example given nor to the exact conditions stated therein.

Example 29 parts of 4-toluidine are diazotized in the usual manner and the diazo solution obtained is combined with 55 parts of 5-hydroxynaphthalene-1-carboxylic acid in a strongly alkaline medium. Then 150 parts of sodium hydrosulfite are added at about 35 to 40° to the solution of the scarlet monoazo dyestuff formed whereby heating occurs. When the reduction is complete, the reaction mixture is cooled and separated from the 4-toluidine formed by filtration and from the filtrate the 4-hydroxy-1-aminonaphthalene-8-carboxylic acid formed of the formula:

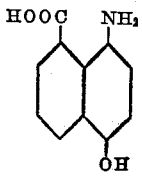

is precipitated by the addition of sodium bisulfite. It is a colorless precipitate which is filtered off and washed with water.

In order to prepare 4-hydroxynaphthostyril of the formula:

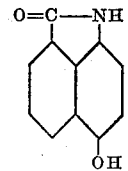

from the 4-hydroxy-1-aminonaphthalene-8-carboxylic acid thus obtained, it is introduced as a paste in small proportions into boiling dilute hydrochloric acid effecting an initially clear solution. Then brown-yellow crystals separate from the solution, which, after the solution has been boiled for about one hour, are filtered off, washed and dried. The products thus obtained melts at 278° with decomposition and is identical with that described in U. S. Patent 2,108,879.

The 4-hydroxynaphthostyril may also be prepared by directly treating the solution of the 4-hydroxy-1-aminonaphthalene-8-carboxylic acid, obtained by reduction of the monoazo-dyestuff, with hydrochloric acid while heated.

We claim:

1. A process which comprises combining 5-hydroxynaphthalene-1-carboxylic acid in a strongly alkaline medium with a diazo-compound, reducing the monoazo dyestuff thus formed in an alkaline medium and converting the resulting compound to the 4-hydroxynaphthostyril in an acid medium.

2. A process which comprises combining 5-hydroxy-naphthalene-1-carboxylic acid in a strongly alkaline medium with a diazo compound, and reducing the monoazo dyestuff thus formed in an alkaline medium.

WERNER ZERWECK.
WILHELM KUNZE.